United States Patent
Duda et al.

(10) Patent No.: US 9,251,830 B1
(45) Date of Patent: Feb. 2, 2016

(54) WAVEGUIDE CLADDING LAYER WITH TRANSPARENT HEAT SINK FOR HEAT-ASSISTED MAGNETIC RECORDING DEVICE

(71) Applicant: Seagate Technology LLC, Cupertino, CA (US)

(72) Inventors: John Charles Duda, Bloomington, MN (US); Seung-Yeul Yang, Eden Prairie, MN (US); Manuel Charles Anaya-Dufresne, Edina, MN (US); Scott Franzen, Savage, MN (US); Michael Christopher Kautzky, Eagan, MN (US); Xiaoyue Huang, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/716,517

(22) Filed: May 19, 2015

(51) Int. Cl.
| | |
|---|---|
| *G11B 11/00* | (2006.01) |
| *G11B 5/60* | (2006.01) |
| *G11B 5/48* | (2006.01) |
| *G11B 13/08* | (2006.01) |
| *G11B 5/31* | (2006.01) |
| *G11B 7/1387* | (2012.01) |
| *G11B 5/00* | (2006.01) |
| *G11B 7/1384* | (2012.01) |

(52) U.S. Cl.
CPC ............... *G11B 5/6088* (2013.01); *G11B 5/314* (2013.01); *G11B 5/4866* (2013.01); *G11B 7/1387* (2013.01); *G11B 13/08* (2013.01); *G11B 7/1384* (2013.01); *G11B 2005/0021* (2013.01)

(58) Field of Classification Search
CPC ...................... G11B 5/4866; G11B 2005/0021; G11B 5/314; G11B 5/6088; G11B 2005/001; G11B 7/1387; G11B 5/3116; G11B 13/045; G11B 11/10554; G11B 11/1058; G11B 5/3133; G11B 5/3163; G11B 13/08; G11B 7/1384; G11B 7/1206; G11B 7/1263
USPC .............................. 369/13.33, 13.13, 112.27
See application file for complete search history.

(56) References Cited

U.S. PATENT DOCUMENTS

| | | | |
|---|---|---|---|
| 7,944,782 B2 | 5/2011 | Cho et al. | |
| 8,374,063 B2 | 2/2013 | Tanaka et al. | |
| 8,451,555 B2 * | 5/2013 | Seigler ............... | G11B 5/02 360/125.01 |
| 8,456,965 B2 | 6/2013 | Naniwa et al. | |
| 8,923,100 B1 * | 12/2014 | Wessel ............... | G11B 5/6088 369/112.27 |
| 8,988,827 B1 * | 3/2015 | Balamane ............ | G11B 5/314 360/125.31 |
| 9,099,112 B1 * | 8/2015 | Balamane ............ | G11B 5/314 |
| 2014/0376340 A1 * | 12/2014 | Cheng ................. | G11B 5/3163 369/13.33 |
| 2014/0376343 A1 * | 12/2014 | Cheng ................. | G11B 5/3106 369/13.33 |

* cited by examiner

*Primary Examiner* — Ali Neyzari
(74) *Attorney, Agent, or Firm* — Hollingsworth Davis, LLC

(57) ABSTRACT

An apparatus comprises a slider of a magnetic recording head having an air bearing surface (ABS), a write pole terminating at or near the ABS, and a near-field transducer (NFT) adjacent the write pole. A light delivery arrangement extends through the slider and terminates at the ABS. The light delivery arrangement is configured to communicate light through the slider and to the NFT. A transparent heat sink layer abuts a terminal end portion of the light delivery arrangement and terminates at the ABS. The heat sink layer has a thermal conductivity greater than that of the light delivery arrangement.

20 Claims, 7 Drawing Sheets

WAVEGUIDE CLADDING LAYER WITH TRANSPARENT HEAT SINK FOR HEAT-ASSISTED MAGNETIC RECORDING DEVICE

SUMMARY

Embodiments are directed to an apparatus comprising a slider of a magnetic recording head having an air bearing surface (ABS), a write pole terminating at or near the ABS, and a near-field transducer (NFT) adjacent the write pole. An optical waveguide is situated adjacent the NFT and configured to communicate light through the slider and to the NFT. The waveguide comprises a first cladding layer proximate the NFT, a second cladding layer distal of the NFT having a terminal end spaced apart from the ABS, and a core between the first and second cladding layers. A transparent heat sink layer abuts the terminal end of the second cladding layer and terminates at the ABS. The heat sink layer has a thermal conductivity greater than that of the second cladding layer.

Some embodiments are directed to an apparatus comprising a slider of a magnetic recording head having an air bearing surface (ABS), a write pole terminating at or near the ABS, and a near-field transducer (NFT) adjacent the write pole. A light delivery arrangement extends through the slider and terminates at the ABS. The light delivery arrangement is configured to communicate light through the slider and to the NFT. A transparent heat sink layer abuts a terminal end portion of the light delivery arrangement and terminates at the ABS. The heat sink layer has a thermal conductivity greater than that of the light delivery arrangement.

Other embodiments are directed to a method comprising activating an energy source that directs energy to a waveguide core of a recording head, the waveguide core disposed between a first cladding layer and a second cladding layer. The method also comprises causing the energy to propagate through the waveguide core to a near-field transducer (NFT) proximate a write pole and a media-facing surface of the recording head, the energy causing a surface plasmon resonance of the NFT to heat a magnetic recording medium. The method further comprises conducting heat away from the waveguide core and the NFT via a transparent heat sink layer disposed between a terminal end of the second cladding layer and the media-facing surface of the recording head.

The above summary is not intended to describe each disclosed embodiment or every implementation of the present disclosure. The figures and the detailed description below more particularly exemplify illustrative embodiments.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
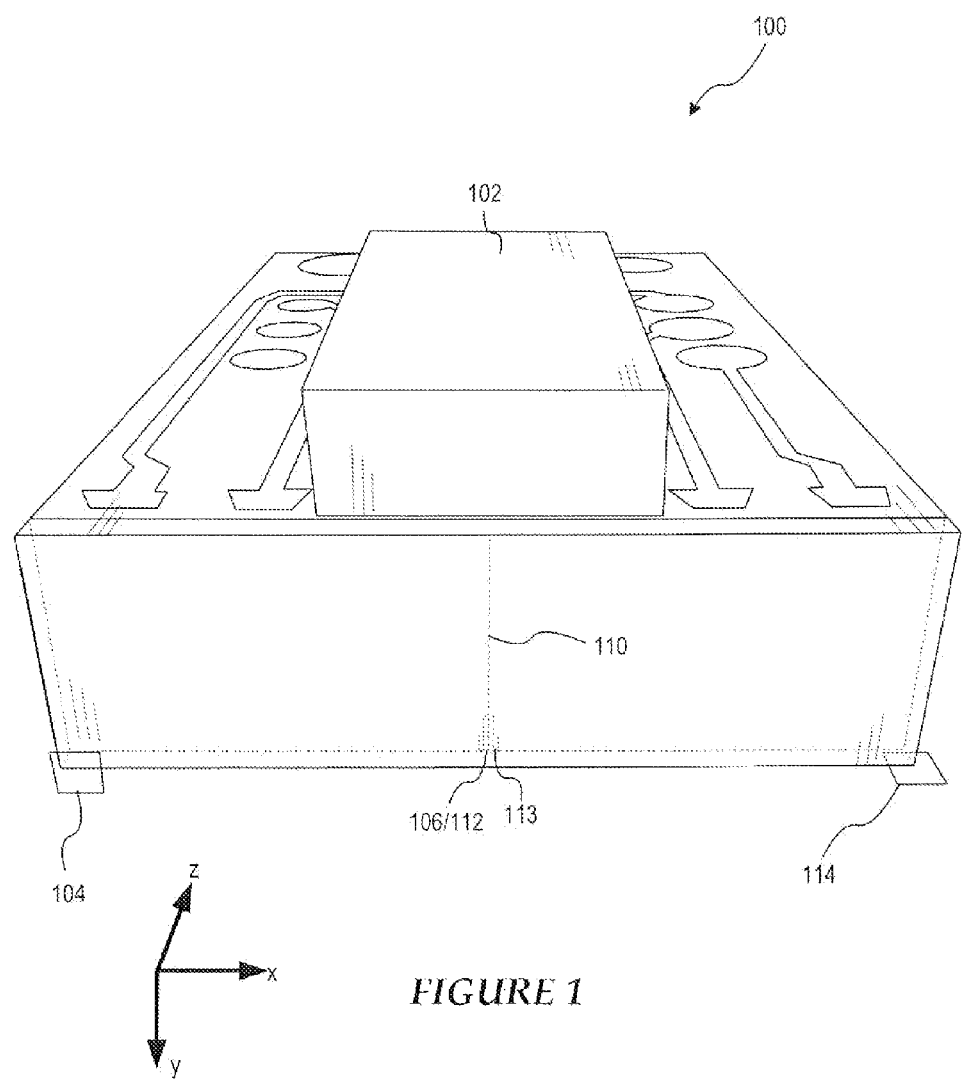
FIG. 1 is a perspective view of a slider in which the various embodiments disclosed herein may be implemented.

The present disclosure generally relates to regulating heat produced by a recording head configured for heat-assisted magnetic recording (HAMR), also referred to as energy-assisted magnetic recording (EAMR), thermally-assisted magnetic recording (TAMR), and thermally-assisted recording (TAR). This technology uses a laser source and a near-field transducer (NFT) to heat a small spot on a magnetic disk during recording. The heat lowers magnetic coercivity at the spot, allowing a write transducer to change the orientation of a magnetic domain at the spot. Due to the relatively high coercivity of the medium after cooling, the data is less susceptible to paramagnetic effects that can lead to data errors.

A HAMR drive generally uses a laser diode to heat the recording medium to aid in the recording process. The laser diode generates heat as do other components (near-field transducer, writer, reader, heater elements) disposed on the slider of a HAMR head. Regulating heat within a HAMR recording head is important to ensure proper operation and longevity of the HAMR device. During a write operation, for example, laser diode heating can vary the junction temperature of the laser diode, causing a shift in laser emission wavelength, leading to a change of optical feedback from optical path in slider to the cavity of the laser diode, a phenomenon that is known to lead to mode hopping and/or power instability of the laser diode. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy, often with different magnitude, with a second wavelength) performing "mode hopping." Temperature variation is known to cause mode hopping in laser diodes. Mode hopping is problematic for HAMR applications, as mode hopping leads to laser output power jumping and magnetic transition shifting from one block of data to another.

Large transition shifts in a block of data may not be recoverable by channel decoding, resulting in error bits.

Other adverse conditions can arise from the high temperature environment of a HAMR head, such as recession or deterioration of the peg or media-facing protuberance of a near-field transducer of the recording head. Plasmonic near-field transducers (NFTs), for example, can generate a large amount of heat in their writing tip, also called a "peg" or "peg region." This heat can negatively impact the operational life of the NFT. As is known, temperature increases in the peg region are a challenge for the durability of HAMR devices. A temperature mismatch between the relatively higher temperature peg region and relatively lower temperature enlarged region, as well as mechanical stresses, are thought to lead to an exchange of material (and vacancies) between the two regions. The temperature mismatch between the two regions, as well as the mechanical stresses, are thought to contribute to peg deformation and peg recession, which can lead to failure of the HAMR device. As peg temperatures increase, so do the temperature mismatches between the peg and the enlarged region of the NFT, leading to a reduction in NFT service life.

During HAMR writing of data to a magnetic recording medium, the medium should ideally be several hundred degrees hotter than the recording head. As a result, there will be a net heat flux from medium to the recording head across an air gap, thereby resulting in higher temperatures at the air bearing surface of the recording head. Many regions of the HAMR recording head are made of amorphous dielectrics with low thermal conductivities. Such regions of low thermal conductivity at or near the ABS do not provide for efficient dissipation of heat resulting from the net heat flux from the medium to the recording head.

The light delivery arrangement of a HAMR recording head is preferably fabricated using optical grade materials, such as amorphous dielectrics with low thermal conductivities. The primary components of a HAMR light delivery arrangement are a bottom cladding layer, a top cladding layer, and a core situated between the bottom and top cladding layers. Together these three components define an optical waveguide. Other optical components can be included in the light delivery arrangement, such as an optical coupler and a mode converter. The optical coupler is configured to couple light produced by a laser diode into the waveguide. The mode converter, which may be utilized with an external phase-shifter, is situated within the core and converts the mode of the light and shifts phase in a manner appropriate for exciting the NFT. Because efficient operation of the light delivery arrangement is paramount in the design of a HAMR recording head (e.g., using optical grade materials throughout), components and arrangements that serve to manage the thermal environment of the recording head should be implemented so as not to adversely impact performance of the light delivery arrangement. The priority given to the design of the light delivery arrangement of a HAMR recording head complicates the thermal management design.

Embodiments of the disclosure are directed to integration of a heat sink layer between the light delivery arrangement and the ABS of a HAMR recording head. According to various embodiments, a portion of the light delivery arrangement at the ABS is truncated, and a heat sink layer is inserted between the truncated portion of the light delivery arrangement and the ABS. The heat sink layer is formed from a transparent material, such as a transparent dielectric, having high thermal conductivity relative to other portions of the light delivery arrangement. Replacing low thermally conductive optical grade material with a transparent material with relatively high thermal conductivity serves to spread heat across a larger area and reduce ABS temperature, while minimally (e.g., negligibly) impacting performance of the light delivery arrangement.

Figure 2:
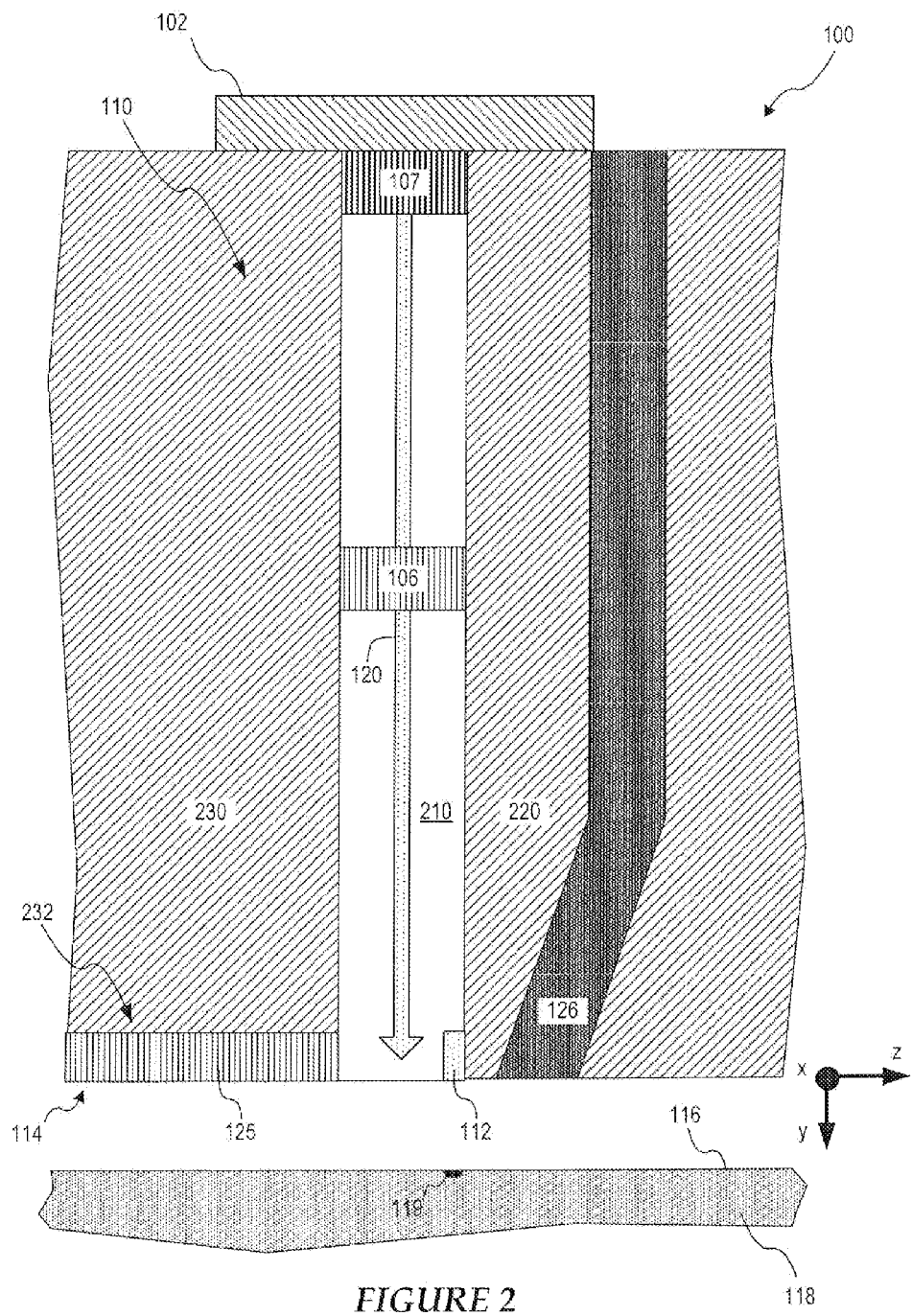
FIG. 2 is a cross-sectional view of a slider showing a light delivery arrangement and a heat sink layer disposed between a portion of the light delivery arrangement and an air bearing surface (ABS) of the slider in accordance with various embodiments.
Figure 3:
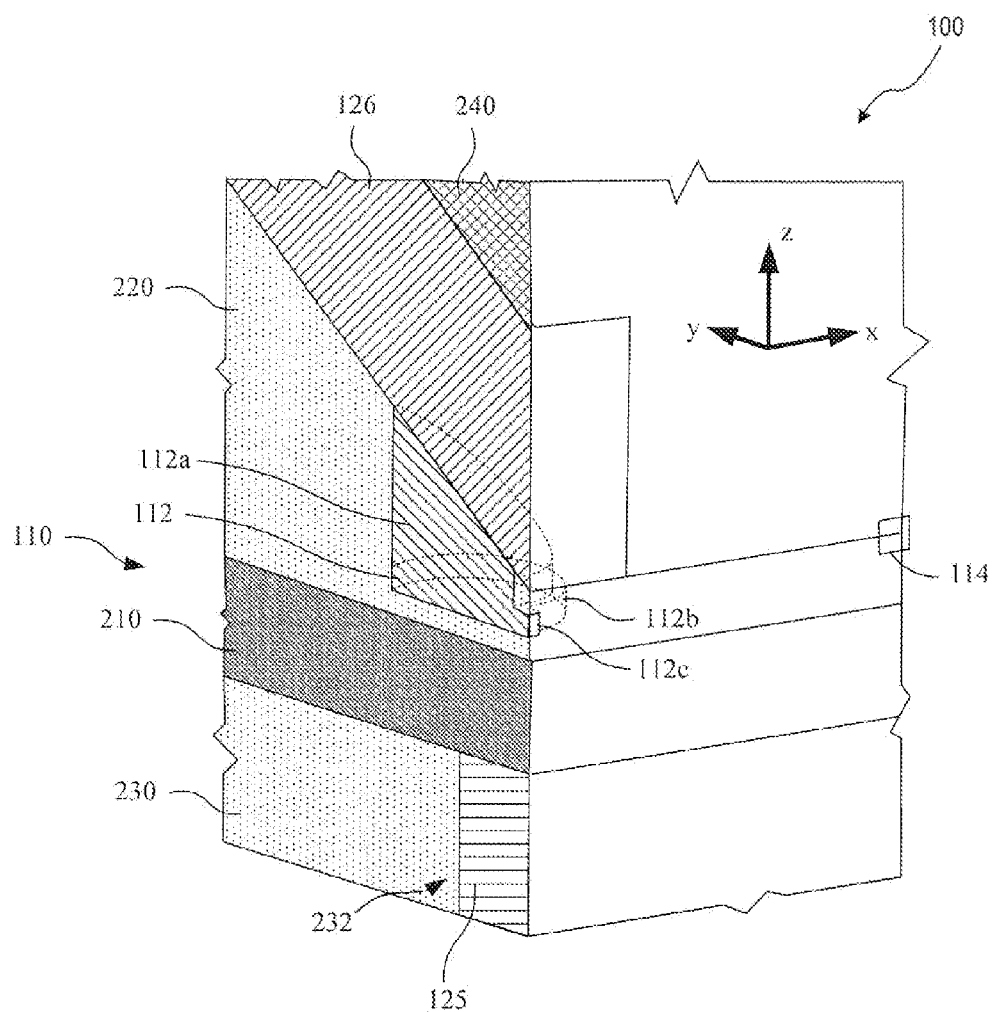
FIG. 3 is a perspective, cross-sectional view of a slider showing a light delivery arrangement and a heat sink layer disposed between a portion the light delivery arrangement and an ABS of the slider in accordance with various embodiments.

Embodiments of a HAMR slider 100 are illustrated in FIGS. 1-3. As shown, the HAMR slider 100 includes a light source (e.g., a laser diode) 102 located proximate a trailing edge surface 104 of the slider 100. An optical wave (e.g., a laser beam) 120 generated by the light source 102 is delivered to a mode converter 106, such as a higher order mode converter (HOMC), and from the mode converter 106 to an NFT 112 (see FIG. 2) via an optical waveguide 110. Generally, the mode converter 106 may be utilized with an external phase-shifter (not shown) that receives the mode converted light and shifts phase appropriate for exciting the NFT 112. In this configuration, the mode converter 106 can be made compact and introduce negligible optical losses. The optical wave exiting the mode converter 106 is directed onto the NFT 112 located proximate a read/write head 113. The NFT 112 is aligned with a plane of an air bearing surface 114 of the slider 100, and one edge of the read/write head 113 is on the ABS 114. The air bearing surface 114 faces, and is held proximate to, a surface 116 of a magnetic medium 118 (see FIG. 2) during device operation. In the following, the ABS 114 is also referred to as a media-facing surface.

The light source 102 in this representative example may be an integral, edge firing device, although it will be appreciated that any source of electromagnetic energy may be used. For example, a surface emitting laser (SEL), instead of an edge firing laser, may be used as the source 102. A light source may also be mounted alternatively to other surfaces of the slider 100, such as the trailing edge surface 104. While the representative embodiment of FIG. 1 shows the waveguide 110 integrated with the slider 100, any type of light delivery configuration may be used. For example, in a free-space light delivery configuration, the light source 102 may be external to the slider 100, and coupled to the mode converter 106 by way of optic fibers and/or waveguides. For instance, the slider 100 in one such arrangement may include a grating coupler into which the light source 102 is coupled and the electromagnetic energy may be delivered to the mode converter 106 using the slider-integrated waveguide 110.

A HAMR device utilizes the types of optical devices described above to heat a magnetic recording media (e.g., hard disk) in order to overcome superparamagnetic effects that limit the areal data density of typical magnetic media. When writing with a HAMR device, the electromagnetic energy (e.g., laser or light) is concentrated onto a small hotspot 119 over the track of the magnetic medium 118 where writing takes place, as is shown in the embodiment of FIG. 2. The light from the source 102 propagates to the NFT 112, e.g., either directly from the source 102 or through the mode converter 106 or by way of a focusing element. Other optical elements, such as couplers, mirrors, prisms, etc., may also be formed integral to the slider. FIG. 2, for example, shows a coupler 107 adjacent the light source 102, which is configured to couple light produced from the light source 102 to the waveguide 110. The optical elements used in HAMR recording heads are generally referred to as integrated optics devices and are formed from optical grade materials.

The field of integrated optics relates to the construction of optics devices on substrates, sometimes in combination with electronic components, to produce functional systems or subsystems. For example, an integrated optics device may transfer light between components via rectangular dielectric slab or channel waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 700-1550 nm, yet the desired hot spot 119 is on the order of 50 nm or less. Thus the desired hot spot size is well below half the wavelength of the light. Optical focusers cannot be used to obtain the desired hot spot size, being diffraction limited at this scale. As a result, the NFT 112 is employed to create a hotspot on the media.

The NFT 112 is a near-field optics device configured to generate local surface plasmon resonance at a designated (e.g., design) wavelength. The NFT 112 is generally formed from a thin film of plasmonic material (e.g., gold, silver, copper) on a substrate. In a HAMR slider 100, the NFT 112 is positioned proximate the write pole 126 of the read/write head 113. The NFT 112 is aligned with the plane of the ABS 114 parallel to the read/write surface 116 of the magnetic medium 118. A waveguide 110 and optional mode converter 106 and/or other optical element directs electromagnetic energy (e.g., light) onto the NFT 112.

The NFT 112 achieves surface plasmon resonance in response to the incident electromagnetic energy. The plasmons generated by this resonance are emitted from the NFT 112 towards the magnetic medium 118 where they are absorbed to create a hotspot. At resonance, a high electric field surrounds the NFT 112 due to the collective oscillations of electrons at the metal surface (e.g., substrate) of the magnetic medium 118. At least a portion of the electric field surrounding the NFT 112 tunnels into, and gets absorbed by, the magnetic medium 118, thereby raising the temperature of a spot 119 on the medium 118 as data is being recorded.

FIG. 2 shows a detailed partial cross-sectional view of an embodiment of the HAMR slider 100 in accordance with various embodiments. As illustrated, the NFT 112 is positioned proximate the ABS (or media-facing surface) 114 and a magnetic write pole 126. The ABS 114 is shown positioned proximate the surface 116 of the magnetic recording medium 118 during device operation. In the orientation illustrated in FIG. 2, the ABS 114 is arranged parallel to the x-z plane. Electromagnetic energy (e.g., laser light) 120 from the light source (e.g., laser diode) 102 is delivered to the mode converter 106 (optional) via the coupler 107 and propagates along the waveguide 110 in the y-direction. Optical wave 120 exits the mode converter 106 and is delivered to the NFT 112 along waveguide 110 in the y-direction. The NFT 112 generates surface plasmon enhanced near-field electromagnetic energy proximate the surface 116 of the medium 118, and exits the NFT 112 in the y-direction. This results in the production of a highly localized hot spot 119 (e.g., 50 nm in width) on the media surface 116 when in close proximity to ABS 114. The write pole 126 generates a magnetic field (e.g., in a y- or perpendicular direction) used for changing the magnetic orientation of the hotspot on the surface 116 during writing.

FIG. 3 is a cross-sectional perspective view of the slider 100 which shows additional details of the structure shown in FIG. 2. This cross-section is taken along a cross-track centerline of the body of slider 100. In this view, it can be seen that the NFT 112 is configured as a circular disk 112b with a peg 112c protruding towards the media-facing surface 114. The NFT 112 includes a heat sink region 112a which also has a circular cross section in the xy-plane. Also seen in this view is a heat sink 240 which serves to conduct heat away from the write pole 206 and NFT 112.

The waveguide 110 includes a layer of core material 210 surrounded by first and second cladding layers 220 and 230. The first cladding layer 220 is shown proximate the NFT 112 and the write pole 126. The second cladding layer 230 is spaced away from the first cladding layer 220 and separated therefrom by the waveguide core 210. The core layer 210 and cladding layers 220 and 230 may be fabricated from dielectric materials, such as optical grade amorphous material with low thermal conductivities. For example, the waveguide core 210 may be made from $Ta_2O_5$, $TiO_2$, ZnS, or SiN, and the cladding 220 and 230 may be made from $Al_2O_3$, $SiO_2$, $Y_2O_3$, $Hf_2O_3$, $MgF_2$, $MgO_2$, or $SiON_x$. The first and second cladding layers 220 and 230 may each be made of the same or a different material.

The core 210 and cladding layers 220 and 230 may generally be part of a light delivery arrangement or system that receives light from a source (e.g., laser diode) and directs it to the NFT 112. The materials are selected so that the refractive index of the core layer 210 is higher than refractive indices of the cladding layers 220 and 230. This arrangement of materials facilitates efficient propagation of light through the waveguide core 210. Optical focusing elements (not shown) such as mirrors, lenses, etc., may be utilized to concentrate light onto the NFT 112. These and other components may be built on a common substrate using wafer manufacturing techniques known in the art. The waveguide 110 may be configured as a planar waveguide or channel waveguide.

The second cladding layer 230 shown in FIGS. 2 and 3 has a proximal region extending toward the ABS 114 from the coupler 107 (shown in FIG. 2) and a distal region that terminates at a truncated region 232 proximal of the ABS 114. The truncated region 232 is shown extending into the slider 100 from the ABS 114, such that the terminal end of the second cladding layer 230 is spaced away from the ABS 114. In conventional devices, this truncated region 232 is instead a continuous portion of the second cladding layer 230 formed from the same optical grade material as that of the proximal portion of the second cladding layer 230. According to embodiments of the disclosure, the truncated region 232 is formed to include a heat sink layer 125 fabricated (e.g., patterned) from a transparent dielectric material with a thermal conductivity higher than that of the optical grade material of the second cladding layer 230. In general, the transparent dielectric material used to form the heat sink layer 125 has a thermal conductivity higher than that of the optical grade material of the second cladding layer 230, the first cladding layer 220, and the core 210.

According to various embodiments, the heat sink layer 125 can comprise a transparent dielectric material, such as a Group III-V arsenide or nitride material. According to various embodiments, the heat sink layer 125 can comprise one of aluminum nitride, magnesium oxide, silicon, germanium, and diamond, for example.

Figure 4:
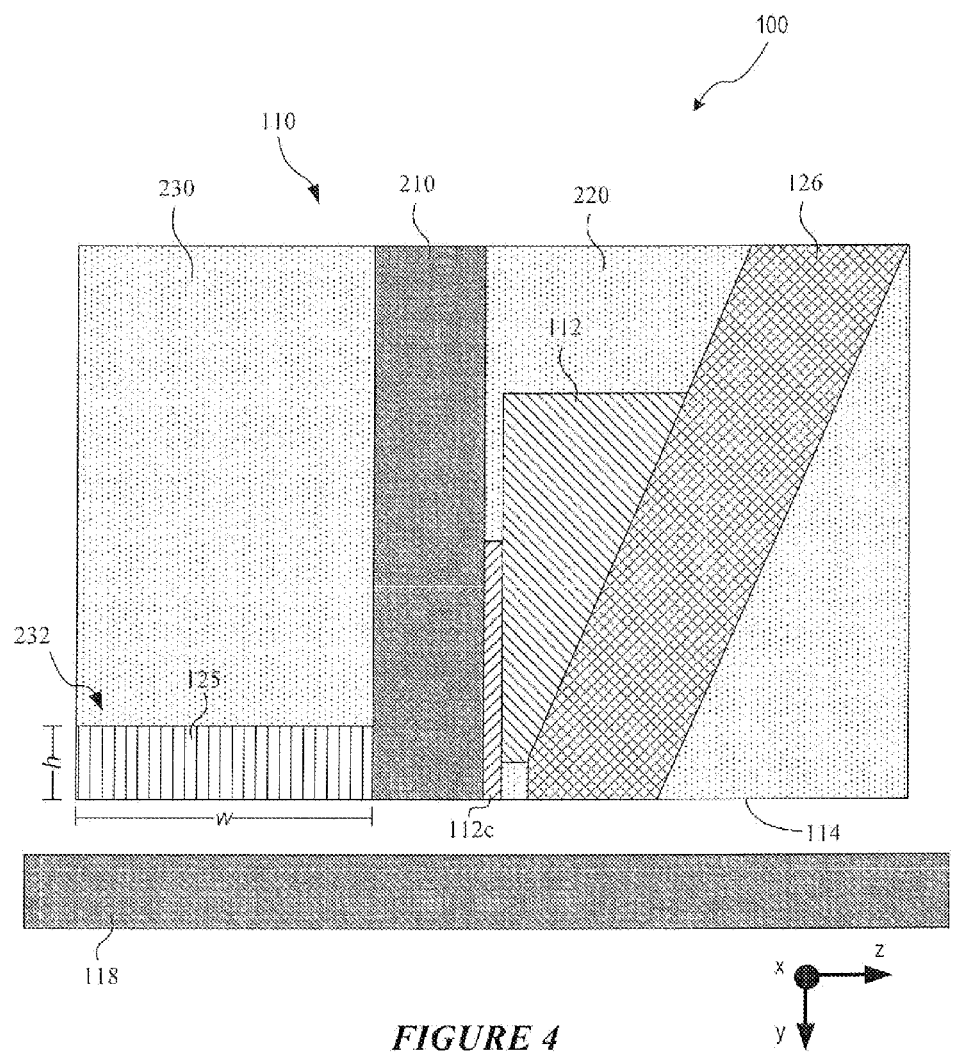
FIG. 4 is a cross-sectional detailed view of a slider showing a portion of a light delivery arrangement with a heat sink layer abutting the light delivery arrangement and an ABS of the slider in accordance with various embodiments.

FIG. 4 shows a detailed view of the light delivery arrangement of the slider 100 near the ABS 114 in accordance with various embodiments. As discussed above, a terminal region of the second cladding layer 230 near the ABS 114 abuts a heat sink layer 125 formed of a transparent material having a high thermal conductivity relative to the materials used to form the second cladding layer 230. The heat sink layer 125 provides for effective transport of heat incident from the magnetic recording medium 118 (and from the NFT 112) generally in an up-track direction (along the z-axis direction) without adversely impacting optical performance of the light delivery arrangement. The heat sink layer 125 can also be configured to provide for effective transport of heat incident from the magnetic recording medium 118 (and from the NFT 112) generally in a cross-track direction (along the x-axis direction) without adversely impacting optical performance of the light delivery arrangement. The heat sink layer 125 can further be configured to provide for effective transport of heat incident from the magnetic recording medium 118 (and from the NFT 112) generally in both an up-track direction and a cross-track direction without adversely impacting optical performance of the light delivery arrangement. Incorporation of the heat sink layer 125 at the terminal end of the second cladding layer 230 serves to reduce the maximum temperature at the ABS 114 and, in doing so, also reduces the maximum temperature of the NFT 112 with no or only negligible impact on light delivery system performance. This reduction in ABS temperature correlates with reduced heat build-up at the ABS 114, and the reduced NFT temperature correlates with increased longevity of the NFT 112.

According to various embodiments, the heats sink layer 125 has a height, h, which extends into the body of the slider 100 along the y-plane indicated in FIG. 4. The height, h, of the heat sink layer 125 can be between about 50 and 250 nm, such as between about 100 and 200 nm or between about 125 and 175 nm, for example. In some configurations, the height, h, of the heat sink layer 125 can be greater than 250 nm (e.g., between 250 nm and about 350 nm) as long as any reduction in light delivery system performance is minimal or negligible (e.g., no greater than about 10% reduction in designed NFT operating temperature or when compared to an equivalent design with no heat sink layer 125).

The heat sink layer 125 has a width, w, which extends along the ABS 114 in an up-track direction (along the z-axis in FIG. 4). The width, w, of the heat sink layer 125 can extend to between 500 nm and 10 μm in some configurations. In other configurations, the width, w, of the heat sink layer 125 can be between about 1 μm and 5 μm or between about 5 μm and 10 μm, for example. The width, w, can extend as far as the next component of the slider 100 along the z-axis shown in FIG. 4. The heat sink layer 125 has a length, l (not shown), which extends along the ABS 114 in a cross-track direction (along the x-axis in FIG. 4). The length, l, of the heat sink layer 125 can extend to between 500 nm and 10 μm in some configurations. In other configurations, the length, l, of the heat sink layer 125 can be between about 1 μm and 5 μm or between about 5 μm and 10 μm, for example.

In some embodiments, the heat sink layer 125 has a thermal conductivity greater than about 30 W/m-K, such as about 50 W/m-K. In some embodiments, the heat sink layer 125 has a thermal conductivity about the same as that of the write pole 126 (e.g., about 35-50 W/m-K). It is noted that the write pole 126 serves as a heat sink at the first cladding layer 220. Thermal management at the first cladding layer 220 can be enhanced by the addition of a second heat sink layer (not shown) incorporated between the terminal end of the first cladding layer 220 and the ABS 114 proximate the write pole 126. The second heat sink layer can extend across the entire width of the terminal end of the first cladding layer 220 (i.e., to a location adjacent the NFT 112) or partially along the terminal end of the first cladding layer 220 (e.g., from the write pole 126 extending in a down-track (positive z-axis) direction.

Figure 5:
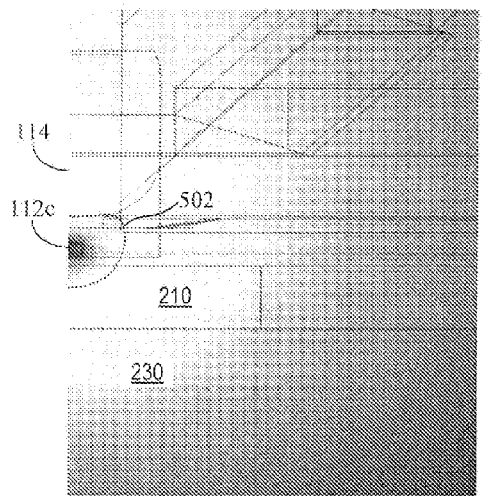
FIGS. 5-7 are temperature profiles showing heat generated at a peg of a near-field transducer, the temperature profiles showing a hot spot that increases in size during a writing operation due to poor thermal conductivity of the surrounding optical grade waveguide core and cladding materials.
Figure 6:
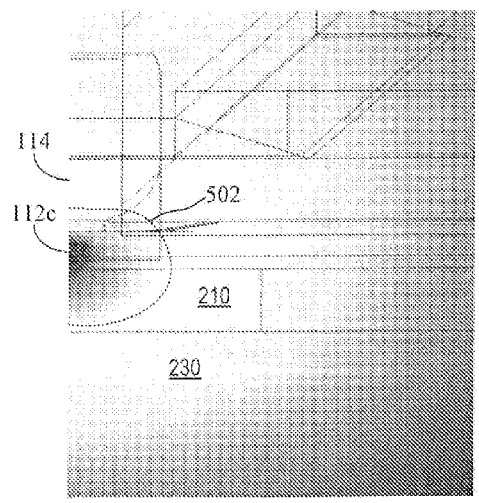
Figure 7:
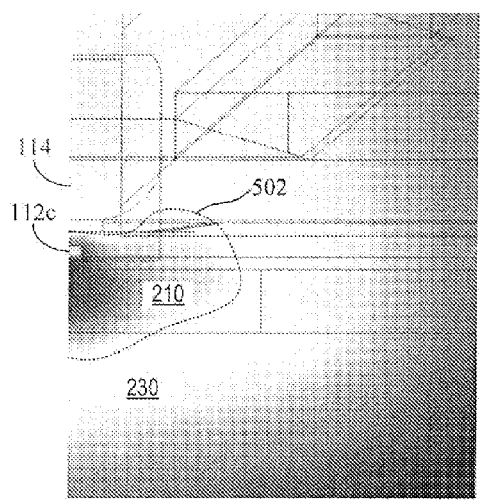
Figure 8:
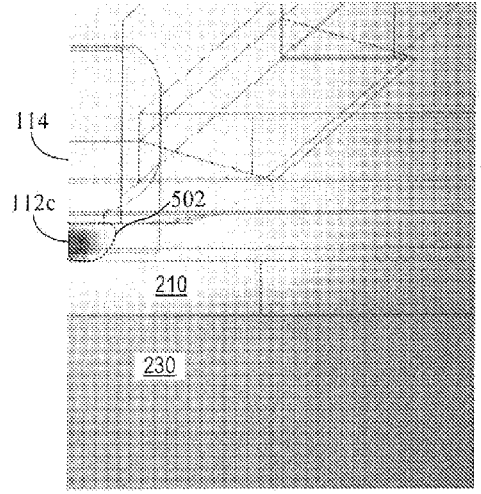
FIG. 8 is temperature profile of a peg of a near-field transducer for a slider that incorporates a light delivery arrangement with a heat sink layer abutting the light delivery arrangement and an ABS of the slider, the temperature profile showing a reduced hot spot during a writing operation.

FIGS. 5-8 are temperature profiles of a slider near the peg 112c of an NFT during a write operation. FIGS. 5-7 show that ABS temperatures progressively increase during writing as the slider 100 is brought into proximity with the hot HAMR media. The hot spot 502 emanating from the peg 112c can be seen to grow (increase in size) in the up-track direction due to an increase in heat transfer coefficients and poor thermal conductivity of the optical grade waveguide/cladding materials. In the illustrative example shown in FIGS. 5-7, the maximum temperature, $T_{max}$, progresses from 73° C. (heat transfer coefficient, h, =1$^5$ W/m$^2$-K) in FIG. 5, to $T_{max}$=75° C. (h=1$^6$ W/m$^2$-K) in FIG. 6, and to $T_{max}$=102° C. (h=1$^7$ W/m$^2$-K) in FIG. 7. FIG. 8 shows a significantly reduced hot spot 502 due to the presence of a heat sink layer at the terminal end of the bottom cladding layer 230. In FIG. 8, the maximum temperature has been reduced to $T_{max}$=62° C. (h=1$^5$ W/m$^2$-K), which is about a 15% reduction in $T_{max}$ when compared to that of FIG. 5.

Figure 9:
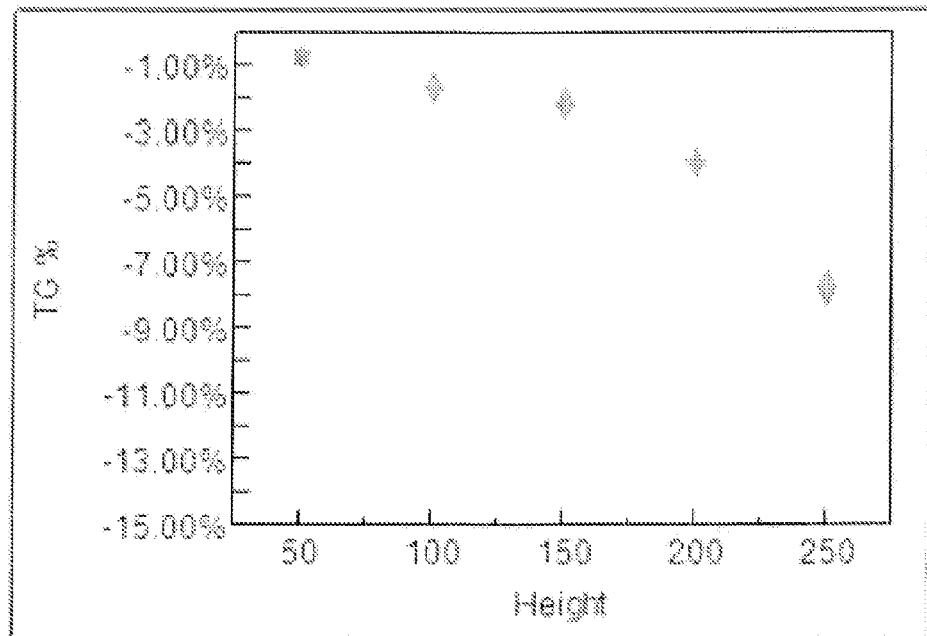
FIG. 9 is a graph of the change in thermal gradient (percentage) in the recording medium as a function of height, h, of a heat sink disposed between a portion of a light delivery arrangement and an ABS of the slider in accordance with various embodiments.

FIG. 9 is a graph of the change in thermal gradient (percentage) in the recording medium 118 as a function of height, h, of the heat sink layer 125. At a height, h, of 50 nm, it can be seen in FIG. 9 that presence of the heat sink layer 125 has almost no negative impact (i.e., no more than a −1% change) of the thermal gradient at the ABS 114. At a height, h, of 150 nm, presence of the heat sink layer 125 results in less than a −3% change in the thermal gradient at the ABS 114. At a height, h, of 200 nm, presence of the heat sink layer 125 results in less than a −4% change in the thermal gradient at the ABS 114. Finally, at a height, h, of 250 nm, presence of the heat sink layer 125 results in less than a −8% change in the thermal gradient at the ABS 114.

Figure 10:
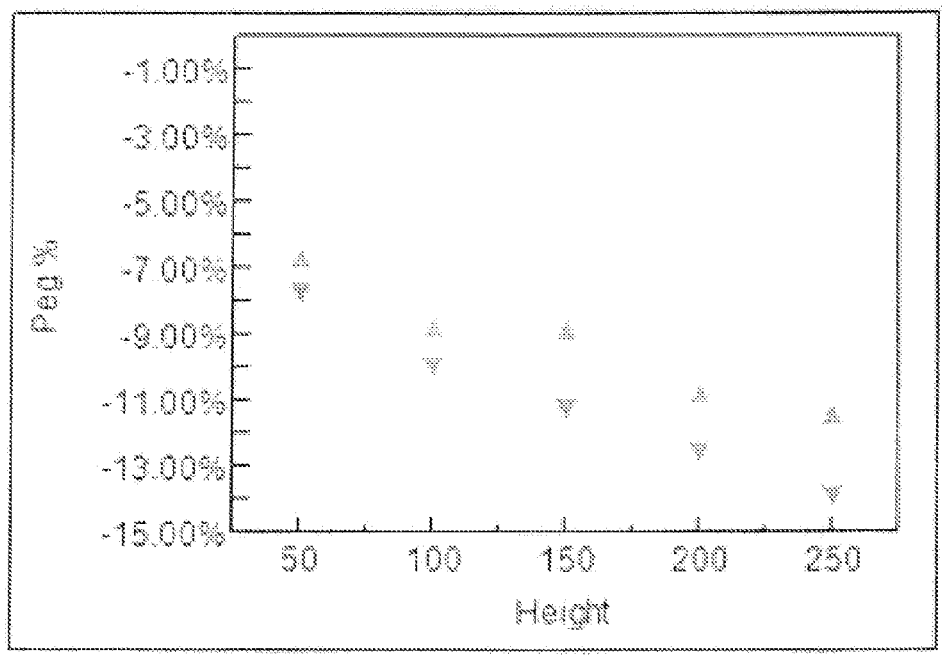
FIG. 10 is a graph of the change in peg temperature (percentage) as a function of height, h, of the heat sink layer disposed between a portion of a light delivery arrangement and an ABS of the slider in accordance with various embodiments.

FIG. 10 is a graph of the change in peg temperature (percentage) as a function of height, h, of the heat sink layer 125. Two sets of data are represented in FIG. 10. Data indicated by an upward facing triangle 1010 represents data for a heat sink layer 125 having a width, w, equal to that of the waveguide core 210 (typically 850 nm in width). Data indicated by a downward facing triangle 1020 represents data for a heat sink layer 125 having a width, w, significantly greater (e.g., 5 μm) than that of the waveguide core 210. At a height, h, of 50 nm, it can be seen in FIG. 10 that the peg temperature is reduced by about 7% and 8% respectively for the heat sink layers of differing width. At a height, h, of 150 nm, the peg temperature is reduced by about 9% and 11% respectively for the heat sink layers of differing width. At a height, h, of 200 nm, the peg temperature is reduced by about 11% and 12% respectively for the heat sink layers of differing width. Finally, at a height, h, of 250 nm, it can be seen in FIG. 10 that the peg temperature is reduced by about 11.5% and 13.5% respectively for the heat sink layers of differing width.

In view of the data shown in FIGS. 9 and 10, it can be seen that a significant reduction in peg temperature with only a negligible reduction in thermal gradient at the ABS can be realized by inclusion of a transparent heat sink layer 125 at the terminal end of the bottom cladding layer 230. The reduction in peg temperature can reduce the deleterious effects of excessively high temperatures at the peg (e.g., peg recession, interdiffusion of materials at/near the peg) while not appreciably impacting the performance of the NFT.

Figure 11:
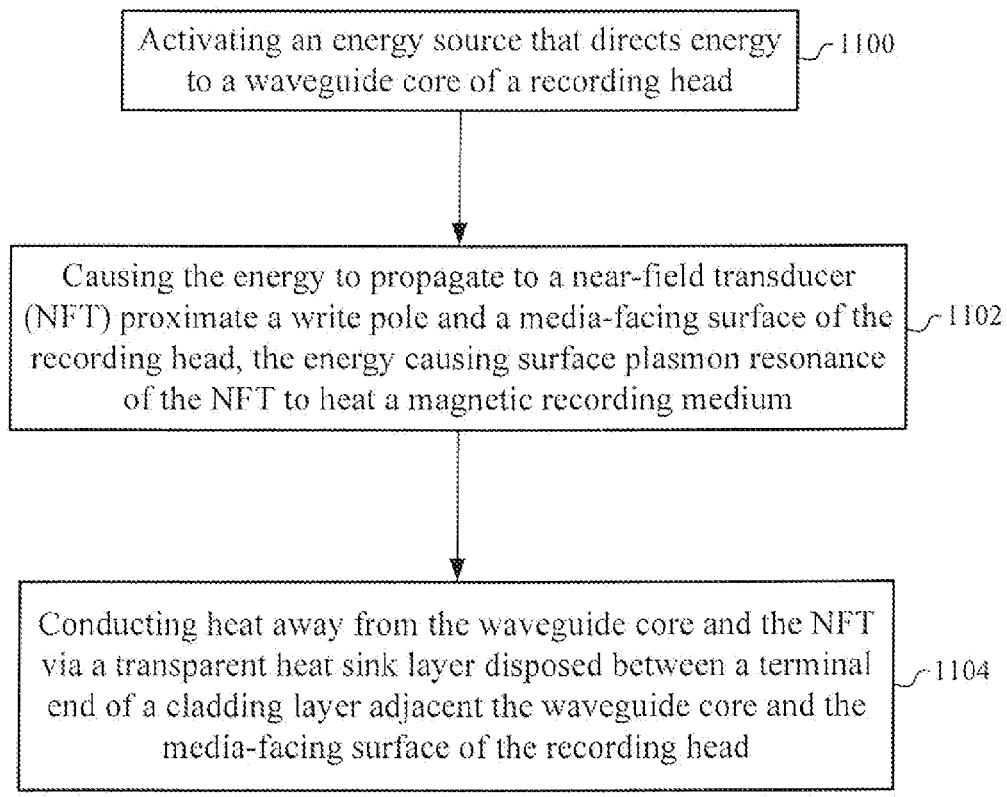
FIG. 11 is a flow chart illustrating various processes involving thermal management at the ABS of a HAMR head in accordance with embodiments of the disclosure.

FIG. 11 is a flow chart illustrating various processes involving thermal management at the ABS of a HAMR head in accordance with embodiments of the disclosure. The method illustrated in FIG. 11 involves activating 1100 an energy source that directs energy to a waveguide core of a HAMR recording head. The method also involves causing 1102 the energy to propagate to a near-field transducer (NFT) proximate a write pole and a media-facing surface (i.e., ABS) of the recording head, the energy causing surface plasmon resonance of the NFT to heat a magnetic recording medium. The method further involves conducting 1104 heat away from the waveguide core and the NFT via a transparent heat sink layer disposed between a terminal end of a cladding layer adjacent the waveguide core and the media-facing surface of the recording head.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
a slider of a magnetic recording head having an air bearing surface (ABS);
a write pole terminating at or near the ABS;
a near-field transducer (NFT) adjacent the write pole; and
an optical waveguide adjacent the NFT and configured to communicate light through the slider and to the NFT, the waveguide comprising:
a first cladding layer proximate the NFT;
a second cladding layer distal of the NFT and having a terminal end spaced apart from the ABS;
a core between the first and second cladding layers; and
a transparent heat sink layer abutting the terminal end of the second cladding layer and terminating at the ABS, the heat sink layer having a thermal conductivity greater than that of the second cladding layer.

2. The apparatus of claim 1, wherein the heat sink layer has a thermal conductivity greater than that of the first cladding layer, the second cladding layer, and the core.

3. The apparatus of claim 1, wherein the heat sink layer extends from the ABS in a direction into the slider by a distance of between about 50 to 250 nm.

4. The apparatus of claim 1, wherein the heat sink layer has a thermal conductivity greater than about 50 W/m/K.

5. The apparatus of claim 1, wherein the heat sink layer has a thermal conductivity about the same as that of the write pole.

6. The apparatus of claim 1, wherein the heat sink layer comprises a transparent dielectric material.

7. The apparatus of claim 1, wherein the heat sink layer comprises a Group III-V arsenide or nitride material.

8. The apparatus of claim 1, wherein the heat sink layer comprises one of aluminum nitride, magnesium oxide, silicon, germanium, and diamond.

9. The apparatus of claim 1, wherein:
the slider has a dimension in a cross-track direction; and
the heat sink layer extends between about 1 µm to 10 µm from a centerline of the waveguide in the cross-track direction.

10. The apparatus of claim 1, wherein:
the slider has a dimension in an up-track direction; and
the heat sink layer extends between about 1 µm to 10 µm from a centerline of the waveguide in the up-track direction.

11. An apparatus, comprising:
a slider of a magnetic recording head having an air bearing surface (ABS);
a write pole terminating at or near the ABS;
a near-field transducer (NFT) adjacent the write pole;
a light delivery arrangement extending through the slider and terminating at the ABS, the light delivery arrangement configured to communicate light through the slider and to the NFT; and
a transparent heat sink layer abutting a terminal end portion of the light delivery arrangement and terminating at the ABS, the heat sink layer having a thermal conductivity greater than that of the light delivery arrangement.

12. The apparatus of claim 11, wherein the heat sink layer extends from the ABS in a direction into the slider by a distance of between about 50 to 250 nm.

13. The apparatus of claim 11, wherein the heat sink layer has a thermal conductivity greater than about 50 W/m/K.

14. The apparatus of claim 11, wherein the heat sink layer has a thermal conductivity about the same as that of the write pole.

15. The apparatus of claim 11, wherein the heat sink layer comprises a transparent dielectric material.

16. The apparatus of claim 11, wherein the heat sink layer comprises a Group III-V arsenide or nitride material.

17. The apparatus of claim 11, wherein the heat sink layer comprises one of aluminum nitride, magnesium oxide, silicon, germanium, and diamond.

18. The apparatus of claim 11, wherein:
the slider has a dimension in a cross-track direction; and
the heat sink layer extends between about 1 µm to 10 µm from a centerline of the waveguide in the cross-track direction.

19. The apparatus of claim 11, wherein:
the slider has a dimension in an up-track direction; and
the heat sink layer extends between about 1 µm to 10 µm from a centerline of the waveguide in the up-track direction.

20. A method comprising:
activating an energy source that directs energy to a waveguide core of a recording head, the waveguide core disposed between a first cladding layer and a second cladding layer;
causing the energy to propagate through the waveguide core to a near-field transducer (NFT) proximate a write pole and a media-facing surface of the recording head, the energy causing a surface plasmon resonance of the NFT to heat a magnetic recording medium; and
conducting heat away from the waveguide core and the NFT via a transparent heat sink layer disposed between a terminal end of the second cladding layer and the media-facing surface of the recording head.

* * * * *